No. 869,017.  
PATENTED OCT. 22, 1907.
C. F. PFALZGRAF.  
SHEET METAL HANDLE.  
APPLICATION FILED JUNE 19, 1906.
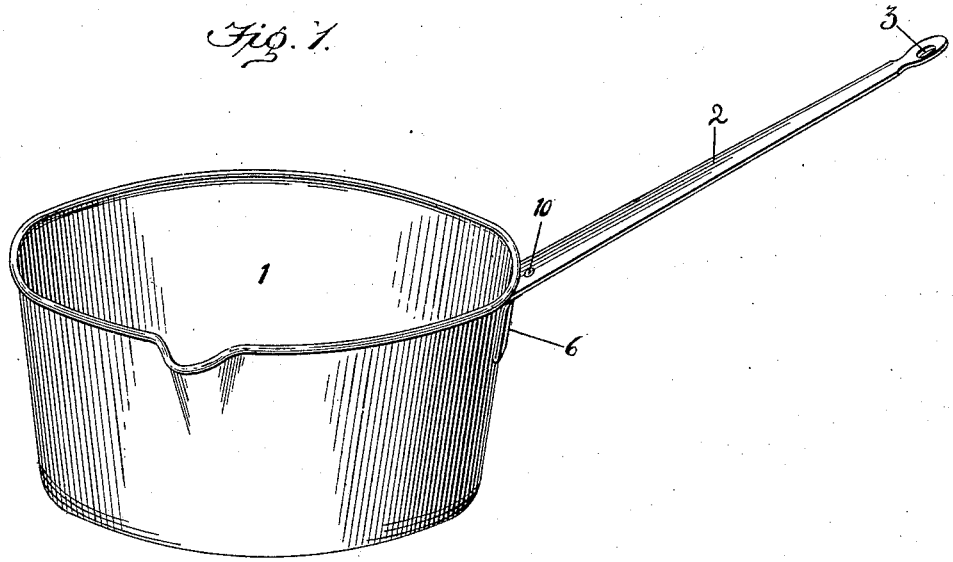
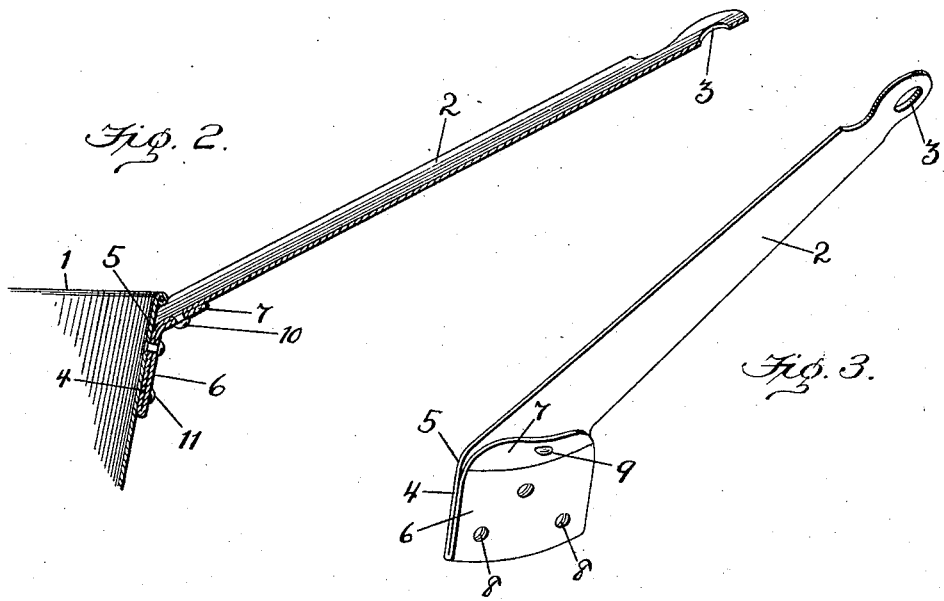
Witnesses  
Edwin L. Bradford  
G. Ferdinand Vogt.
Inventor  
Charles F. Pfalzgraf  
By Mann & Co.  
Attorneys

UNITED STATES PATENT OFFICE.

CHARLES F. PFALZGRAF, OF BALTIMORE, MARYLAND.

SHEET-METAL HANDLE.

No. 869,017.  Specification of Letters Patent.  Patented Oct. 22, 1907.

Application filed June 19, 1906. Serial No. 322,397.

*To all whom it may concern:*

Be it known that I, CHARLES F. PFALZGRAF, a citizen of the United States, residing at Baltimore, in the State of Maryland, have invented certain new and useful Improvements in Sheet-Metal Handles, of which the following is a specification.

My invention relates to improvements in sheet-metal handles for vessels.

In the manufacture of saucepans and similar vessels to which sheet-metal handles of considerable length are attached it has been found that if the handle is formed from metal of sufficient thickness to prevent bending in the usage to which the vessel is subjected, the weight of such handle will make the vessel topple over when the latter is empty. This is particularly true in the smaller vessels, and in those vessels where the walls are formed integrally with the bottom, that is drawn or stamped vessels.

By my invention of the reinforce I am enabled to make a sheet-metal handle of light material to prevent toppling the vessel over, and at the same time give it strength to prevent it from bending when the filled vessel is lifted.

The invention is illustrated in the accompanying drawing, in which,—

Figure 1 shows a perspective view of a vessel provided with the improved handle. Fig. 2 is a sectional view through the handle and a portion of the vessel; and Fig. 3 is a perspective view of the handle alone.

Referring to the drawing by numerals, 1, designates a vessel of any suitable form or construction to which the improved handle, 2, is attached. This handle is formed from sheet-metal and is stiffened by any well-known method of stamping, such for instance as making it concave in cross-section. The upper or outer end of the handle may be provided with a perforation, 3, or other device, by which the vessel may be hung on a nail or hook.

The attaching end of the handle is provided with a downwardly and laterally-projecting portion, 4, which is also curved in a cross-wise direction to conform to the cylindric shape of the vessel; the formation of this downward portion, 4, creates a cross-wise bend, 5. This downward portion is provided with a reinforce plate, 6, which doubles the thickness of the handle at the point where it is to be attached to the vessel; the portion of the handle which is to be grasped by the hand is shown as of single thickness. The reinforce plate lies flat against the attaching end-portion, 4, and its upper end is provided with a lateral brace, 7, which projects underneath the handle adjacent the bend, 5, where ordinary handles of this class are weakest.

A plurality of perforations, 8, are provided in the reinforce plate, 6, and also in the laterally-projecting portion, 4, while a perforation, 9, is in the lateral brace, 7, and the handle adjacent the bend, 5.

A rivet, 10, passes through the perforations, 9, and rigidly secures the brace and handle together, while additional rivets, 11, pass through the perforations, 8, and also through the wall of the vessel and firmly attach the downwardly and laterally-projecting portion, 4, and reinforce plate, 6, to said vessel.

The reinforce plate, 6, is shown as folded back upon the laterally-projecting portion, 4, and in this construction the handle and reinforce consists of one integral piece of sheet-metal, but it is obvious the making of these parts of a single piece are not essential.

By reference to Fig. 3 of the drawing it will be seen that the lateral brace, 7, is curved in a cross-wise direction and that this curvature stiffens the brace and handle and aids in making the handle strongest immediately at the bend, 5, where, without this reinforce, it would be weakest.

It will thus be seen that the grasp-part, 2, of the handle is thin material of single thickness and therefore the outer projecting end will not be heavy enough to tilt the vessel, but at the point where the handle bends and is attached to the vessel it is of double thickness of material.

Having thus described my invention what I claim as new and desire to secure by Letters Patent is,—

1. A sheet-metal vessel provided with a handle having a grasp-part of single thickness and projecting upward from the vessel and also having a downward-projecting end attached to the wall of the vessel and united to said grasp-part by a crosswise bend, 5; and a plate outside of and in contact with said downward-projecting end—said plate having at its upper portion a short brace, 7, which underlaps said crosswise bend and contacts with the said grasp-part only adjacent the said bend.

2. A sheet-metal handle for vessels having its projecting grasp-part of a single thickness and its inner end, which is to fit against the wall of a vessel, of double thickness, and the said two thicknesses being in close contact and both thicknesses having a crosswise bend and secured together.

3. A vessel having a handle whose projecting grasp-portion is of a single piece of sheet-metal and provided with a downward end-portion attached to the wall of the vessel and said two portions united by a crosswise bend, and the lower extremity of said downward end-portion being folded and doubled back on the outside and extending upward beyond said cross-wise bend where it terminates and secured to said grasp-portion by a rivet, 10.

In testimony whereof I affix my signature in presence of two witnesses.

CHARLES F. PFALZGRAF.

Witnesses:
G. FERDINAND VOGT,
CHARLES B. MANN, Jr.